United States Patent [19]

Erhardt

[11] Patent Number: 4,679,090
[45] Date of Patent: Jul. 7, 1987

[54] CCD CIRCUITRY FOR LINE-SEQUENTIAL READ OUT OF A PHOTOSENSOR ARRAY

[75] Inventor: Harry G. Erhardt, East Windsor, N.J.

[73] Assignee: RCA Corporation, Princeton, N.J.

[21] Appl. No.: 824,556

[22] Filed: Jan. 23, 1986

[51] Int. Cl.$^4$ ............................................. H04N 3/14
[52] U.S. Cl. ........................... 358/213.26; 358/213.18
[58] Field of Search ......................... 358/213, 167, 41; 357/24 LR; 377/60-63

[56] References Cited

U.S. PATENT DOCUMENTS

| | | | |
|---|---|---|---|
| 3,967,055 | 6/1976 | Teer et al. | 358/213 |
| 3,995,107 | 11/1976 | Woywood | 358/213 |
| 4,242,700 | 12/1980 | Weimer | 358/44 |
| 4,539,596 | 9/1985 | Elabd | 358/213 |
| 4,598,321 | 7/1986 | Elabd et al. | 358/213 |
| 4,607,286 | 8/1986 | Weimer | 358/213 |
| 4,612,580 | 9/1986 | Weimer | 357/24 LR |

Primary Examiner—Gene Z. Rubinson
Assistant Examiner—Stephen Brinich
Attorney, Agent, or Firm—E. M. Whitacre; J. B. Hayes; A. L. Limberg

[57] ABSTRACT

Diagonally disposed line-selection artifacts appear in the video signal from a CCD imager using a line-transfer register, owing to differential delay in a side-loaded CCD shift register used for transferring charge packets from the image sensing array to the charge sensing output stage. The extent of these line-selection artifacts is shortened in the direction of line scan by spatial multiplexing, so they occur entirely within line retrace intervals. The line-selection artifacts are then suppressed by normal line retrace blanking.

18 Claims, 13 Drawing Figures

Fig. 1
PRIOR ART

LINE SELECTOR 3 CHARACTERISTIC

CCD CIRCUITRY FOR LINE-SEQUENTIAL READ OUT OF A PHOTOSENSOR ARRAY

The present invention relates to solid-state imagers in which the photosensor array is read out line sequentially and, more particularly, to such imagers having line-selection artifacts constrained to occur only during line retrace intervals.

BACKGROUND OF THE INVENTION

In many solid-state imagers, a parallel array of CCD charge transfer channels stores charge packets descriptive of respective elements of an image. These elements are termed "pixels", a contraction of the phrase "picture elements". The storage of the pixels is in a column and row array, with the rows corresponding to lines of scan in the raster-scanned sample-data video output signal.

There are two basic ways to arrange the parallel array of CCD charge transfer channels, in order to facilitate the sequential transfer of the charge packets to charge sensing circuitry for their conversion to respective samples of the raster-scanned video output signal. The seemingly more natural of the two ways is to align the lengths of the charge transfer channels with the rows of the pixel array and then forward clock the charge transfer channels sequentially, one after the other, to generate raster scan.

However, the way the CCD charge transfer channels are parallelly arranged in most prior-art semiconductor imagers is the other way, with the lengths of the charge transfer channels aligned with the columns of the pixel array. The charge transfer channels are forward clocked in parallel to transfer out charge packets parallelly by row, during line retrace intervals in the raster-scanned sample-data video output signal of the solid-state imager. It is customary to load each row of charge packets transferred out parallel-in-time to respective charge transfer stages of an output CCD line register, while halting the forward clocking of that output CCD line register during its loading. (This procedure is referred to as "side-loading".) Then, during the line trace interval, the output CCD line register is forward clocked to transfer the charge packets serially to charge sensing circuitry for conversion to respective samples of a line of the raster-scanned video output signal. The differential time delay in the CCD circuitry for removing charge packets from successive columns of the pixel array presents no problem, because it accords with the need for providing differential time delay of successive pixels in each scan line when generating raster-scanned video signal.

The seemingly more natural method of removing charge packets from the pixel array, a row at a time via a respective charge transfer channel, is described by P. K. Weimer in U.S. Pat. No. 3,683,193 issued Aug. 8, 1972, entitled "BUCKET BRIGADE SCANNING OF SENSOR ARRAY", and assigned to RCA Corporation. Weimer describes a device using photosensors separate from the means for transferring charge packets out of the imager. The means for transferring charge packets out of the imager which Weimer specifically describes is bucket brigade circuitry, but in more modern devices charge coupled device (CCD) circuitry is used instead. These CCD imagers are an interline transfer type, with transfer being in the direction of line scan. Since line scan is customarily in the horizontal direction, these CCD imagers are sometimes referred to as being of horizontal interline transfer type.

CCD imagers which collect photocharge into packets within the row-aligned CCD charge transfer channels themselves are known and are referred to as being line transfer type. Line transfer CCD imagers are described by P. K. Weimer in U.S. Pat. No. 4,242,700 issued Dec. 30, 1980, entitled "LINE TRANSFER CCD IMAGERS", and assigned to RCA Corporation. A line transfer CCD imager has, as its image register, a line-transfer register comprising a parallel array of charge transfer channels disposed in a substrate of semiconductive material, the lengths of which charge transfer channels align with the direction of line scan of the image being televised. To implement line scanning of the image, the charge transfer channels selectively receive dynamic forward clocking signals, usually one charge transfer channel at a time.

The non-selected charge transfer channels receive static clocking signals for inducing a succession of potential barriers in those charge transfer channels. These potential barriers and the channel stops defining the sides of the charge transfer channels define charge collection sites for accumulating charge carriers generated by photoconversion of respective elements (or "pixels") of a radiant energy image impinging on the image register. The accumulation of the charge carriers generated by photoconversion in the charge transfer channels and the portions of the substrate respectively underlying them results in charge packets that sample the intensity of respective pixels of the radiant energy image.

The successive charge packets which sample successive image pixels along a scan line are transferred to a charge sensing stage, or electrometer, for conversion to voltage or current samples of a line of video signal descriptive of a respective line scan of the radiant energy image. The selection of the charge transfer channels to be forward clocked is carried out in a regularly recurrent pattern that defines frame scan.

The frame scan pattern can comprise successive fields in each of which fields each charge transfer channel in the image register is successively selected. Such frame scan pattern does not exhibit field-to-field line interlace.

Frame scan patterns that provide for field-to-field line interlace are also possible. One way to provide field-to-field line interlace is to sequentially forward clock one set of alternate charge transfer channels in the image register during odd-numbered ones of consecutively numbered successive fields of image scan, and to sequentially forward clock the other set of alternate charge transfer channels in the image register during even-numbered fields of image scan. Another frame scan pattern, which provides field-to-field pseudo line interlace, scans successive pairs of image register charge transfer channels, in one of the two possible phasings during odd-numbered fields of image scan, and in the other possible phasing during even-numbered fields of image scan.

The portion of a line transfer CCD imager (or of a CCD imager of related type) which is of concern with regard to the present invention is the CCD circuitry for conveying charge packets from the line-transfer register to the charge sensing stage. In prior art imagers this CCD circuitry includes a CCD shift register, the charge transfer channel of which is perpendicular to the charge transfer channels of the line-transfer register and abuts the ends of the line-transfer register charge transfer channels from which charge packets are transferred be forward clocking. The charge packets, transferred from the line-transfer register charge transfer channel(s) selected for forward clocking, side-load the abutting charge transfer stage(s) of the CCD shift register and are sequentially shifted to the charge sensing stage at the output end of the CCD shift register. Adjacent points in scan lines successively scanned should be separated by a 1H delay in a normal video signal, 1H being the combined durations of field trace interval and field retrace interval—i.e., a full line time. Where the successive line scans (in which the line-transfer register charge transfer channels are successively forward clocked) begin a full line time apart, the different delays through the CCD shift register for the charge packet output of each image register charge transfer channel causes the successive lines of charge packets to reach the charging sensing stage at intervals which differ from 1H. The response of the charge sensing stage to these lines of charge packets tends to exhibit a shearing distortion as between the successive lines of video signal. This tendency can be curbed by compensating for the differential time delay through the CCD shift register. This compensation can be provided, for example, by beginning the selective forward clocking of successive charge transfer channels in the image register on intervals progressively shorter than 1H.

There are problems that the line transfer CCD imager with a side-loaded output register has that are sufficiently serious to have prevented its acceptance as a preferred way of making a CCD imager. This, in spite of the fact that theoretically this type of CCD imager should be preferred over CCD imagers of the popular field transfer and interline transfer types having similar imaging areas, because the line transfer CCD imager takes up less area on a semiconductor substrate. A principal problem arises because the clocking signals applied to a CCD imager are coupled to the charge sensing stage, by means of capacitance between the substrate and the points of signal application. This charge sensing stage typically is an electrometer, the floating diffusion type of electrometer being favored for its low noise.

The floating-diffusion electrometer employs an insulated-gate field effect transistor (FET) with its gate electrode connected to a floating diffusion in a charge transfer channel. The FET has a conduction channel between its source and drain electrodes that has conductance proportional to the voltage at its gate, which is proportional to the magnitude of the charge packet under the floating diffusion. The FET conductance controls current flow through the FET conduction channel for determining the amplitudes of samples generated in the voltage or current regime as electrometer output.

The electrostatic coupling of clocking voltages to the gate electrode of the electrometer FET places voltage variations on that gate electrode which are appreciably large, as compared to the gate voltage induced responsive to the magnitude of the charge packet under the floating diffusion. As long as the clocking voltages coupled to the gate electrode of the electrometer FET recur regularly at the sampling rate at which the electrometer is operated, they heterodyne with the electrometer sampling rate to zero frequency and to harmonics of electrometer sampling rate in the video signal output taken from the CCD imager. Within the baseband, these portions of the frequency spectrum only affect the direct-voltage pedestal on which rides the video signal taken from the CCD imager. This pedestal is discarded in the normal black level clamping and dc-restoration processes in the video processing amplifier used after the CCD imager.

However, variation from the regular recurrence of clocking signal electrostatically coupled to the electrometer FET gate electrode, as occurs during a change in the one(s) of the line-transfer register charge transfer channels selected for forward clocking, heterodynes with the electrometer sample rate to cause disturbances in the baseband frequencies of the video signal and to generate spectra around the harmonics of electrometer sampling rate. This gives rise to undesirable line-selection artifacts in the video signal output. Line-selection artifacts attributable to selection of line-transfer register charge transfer channel(s) for forward clocking, appear as a diagonal line disturbance across television pictures derived from the video output signals of CCD imagers using side-loaded CCD shift registers to transfer charge packets from their line-transfer registers to charge sensing stages that employ floating-diffusion or floating-gate electrometers. This line-selection artifact problem has been described in detail by P. K. Weimer in his U.S. Pat. No. 4,607,286, issued Aug. 19, 1986, entitled "REMOVAL OF LINE SELECTION ARTIFACTS FROM TRACE PORTIONS OF LINE TRANSFER CCD IMAGER OUTPUT SIGNALS", and assigned to RCA Corporation.

A portion of the diagonally disposed line-selection artifacts falls within line retrace intervals and does not disrupt the television picture that is painted on the kinescope screen during successive line trace intervals. Artifacts attributable to selection of line-transfer register charge transfer channels for forward clocking can be made to fall completely within the line retrace intervals. Ways of doing this in line transfer types of CCD imager are described by P. K. Weimer in U.S. Pat. No. 4,607,286.

One way described by Weimer replaces the side-loaded CCD shift register with an end-loaded CCD shift register. This end-loaded CCD shift register has a charge transfer channel with an input port wide enough to connect to the parallel output ports of the line-transfer register charge transfer channels, and with an output port relatively narrow compared to its input port to boost the sensitivity of the electrometer connected thereafter. The charge transfer stages between the input and output ports of this charge transfer channel are sufficient in number to delay charge packets for a time interval longer than line trace interval, but shorter than 1H. The video response from a electrometer connected after this or end-loaded CCD shift register exhibits line-selection artifacts in a line that is perpendicular to line scan and can have no appreciable dimension along scan line, can be fitted entirely within line retrace intervals. There are limitations, imposed by the need for efficient charge transfer, on the rate at which the width of the charge transfer channel of the end-loaded charge transfer channel can converge. These limitations undesirably cause the end-loaded CCD shift register to take up appreciable area on the CCD imager die. Weimer overcomes this problem in part by partitioning the line-transfer register, apportioning its charge transfer channels among bands of adjacent charge transfer channels, and by using a separate end-loaded CCD shift register to connect the output ports of each band of line-transfer register charge transfer channels to the electrometer.

Weimer also describes in his patent application another way of placing the line-selection artifacts entirely within the line retrace intervals. It uses a variable-length clocked CCD delay line before the charge sensing stage of the CCD imager, to compensate for the differential delay introduced by using a parallelly loaded CCD imager.

The line selection artifacts are made to be in a line perpendicular to the direction of line scan, rather than skewed respective to the direction of line scan, in both these ways for putting line-selection artifacts entirely within line retrace intervals. Weimer avoids the use of side-loaded CCD shift registers, which give rise to a line of line-selection artifacts askew line scan, despite side-loaded CCD shift registers being a way of commutating charge packets out of the image register that is economical of imager die area and of clocking power. Despite Weimer's work, there persists a need for a solution to the problem of line-selection artifacts that is more economical of the imager die area and of clocking power.

The inventor finds that such a solution is available using side-loaded CCD shift registers in a different way than they were used in the prior art. In the prior art CCD imagers using line-transfer registers, the differential delay introduced by the side-loaded shift register was typically 240 or 480 pixel scan durations. This, because there are about 480 active lines in a television picture using a 525-line standard. The side-loaded CCD shift register has one charge transfer stage for each line-transfer register charge transfer channel or pair of adjacent line-transfer register charge transfer channels; and the clock rate of the side-loaded CCD shift register is the same as the selected line-transfer register charge transfer channel, which is forward clocked at pixel scan rate. The prior art imagers with line-transfer registers used only 200 to 400 pixels per line trace interval portion of line scan. Since line retrace interval is typically one sixth of 1H, line retrace interval is one-fifth the length of line trace in number of pixel durations. For a line trace interval of 200 to 400 pixel durations, line retrace interval will be 40 to 80 pixel durations. So the diagonal line-selection artifact, 240 to 480 pixels wide in the direction of line scan, perforce extends past line retrace interval and over most of the active picture area described by the CCD imager output signal.

As time passes, however, the spatial resolution desired in CCD imagers increases. CCD imagers of the field transfer type have been proposed which have 768 pixels in each scan line trace portion. It is desirable to make the number of pixels per scan line a multiple of 192 for an NTSC camera since there are an integral number of pixels per cycle of the color subcarrier. (Favorable numbers of pixels per line trace interval exist for other color broadcast standards, such as PAL.) The trend is eventually to a standard of 1536 pixels per line trace interval. At the same time, the number of scan lines per frame may increase to 1050 or so in the television camera, even when only 525 lines are actually broadcast. With the trend towards higher resolution in CCD imagers, the line transfer type of imager becomes increasingly attractive.

Increasing the spatial resolution in the direction of charge transfer channel length is preferable to increasing it in the direction of charge transfer channel width, since the latter way of increasing resolution is accompanied by loss of charge handling capability to additional channel-stop and anti-blooming-drain structure. Furthermore, the increase in resolution along the length of the channel is governed by the degree of overlap of successive gates, rather than by gate electrode length per se, which puts less demand on the photolithographic processes determining pixel size. Accordingly, line transfer image registers facilitate increasing spatial resolution along the scan line direction, and they are to be preferred where the number of scan lines is not increased more than a very few times, in seeking to afford better resolution in the direction perpendicular to scan lines. The limitations of photolithography place constraints on the minimum pixel size in an imager; therefore, increasing the number of pixels per field tends to increase minimum imager size. So the smaller die size available with a line transfer imager becomes more important when one wishes to maximize the number of imagers per wafer of semiconductor material. It is easier to spatially multiplex the read-out of a line transfer imager, to bring out in parallel responses from different portions of the image register, than it is to spatially multiplex the read-out of a field transfer CCD imager or an interline transfer CCD imager transferring perpendicular to line scan. Such spatial multiplexing reduces clocking rates to reduce clocking signal dissipation that heats up the CCD imager.

The greater number of pixels per scan line trace interval increases the number of pixel durations in scan line retrace interval. There are approximately 154 pixel scan durations in line retrace when there are 768 pixel scan durations in line trace; and there are approximately 307 pixel scan durations line retrace when there are 1536 pixel scan durations in line trace. So a diagonal line artifact much wider in the line scan direction in terms of pixels scan durations can be accommodated in the line retrace intervals. Suppose one could shorten, by a small factor, the differential delay in a side-loaded CCD shift register used to transfer charge packets from the image register of a line transfer CCD imager to its electrometer. If the differential delay were shortened four times, for example, then the diagonal line-selection artifact could be caused to fall entirely within the line retrace intervals, in these line transfer CCD imagers with a large number of pixels per scan line.

The same is true for CCD imagers of horizontal interline transfer type. These CCD imagers are representative of a class of imager in which the line transfer register is not used as an image register, as in the line transfer CCD imager, but in which the line transfer register is used as a temporary field storage register. Although the mechanisms for putting charge packets into their line transfer registers are different in the line-transfer and horizontal-interline-transfer types of CCD imager, the problems of transferring the charge packets out of their line transfer registers to their charge sensing stages are identical.

Japanese Kokai Publication No. Sho 54-154348 published Dec. 5, 1979 in its FIG. 7 shows not only a horizontal-interline-transfer type of imager, but another type of CCD imager in which the line transfer imager is used as a temporary field storage register. In this other type of CCD imager, a horizontal-field-transfer imager, there is an image register with a close packed parallel array of horizontally disposed charge transfer channels. It is exposed to a radiant energy image, but the line transfer register and output CCD shift register are shielded from radiation. The output ports of the charge transfer channels in this image register join to the input ports of respective charge transfer channels in the line transfer register. Periodically, after respective image integration times during which clocked in the image register is halted and charge packets are clocked out of the line transfer register one row after another, all charge transfer channels in the image register and in the line transfer register are forward clocked in unison. This transfers the charge packets sampling respective image elements, which packets have accumulated responsive to photoconversion processes, from the image register to re-load the line transfer register. Although the mechanims for putting charge packets into their line transfer registers are different in the line-transfer imager and the horizontal-field-transfer type of imager, the problems of transferring the charge packets out of their line transfer registers to their charge sensing stages are identical.

SUMMARY OF THE INVENTION

Certain types of CCD imager—e.g. the line transfer type—include a line-transfer register comprising a parallel array of charge transfer channels, each storing a succession of charge packets descriptive of a respective scan line of an optical image. CCD shift registers sequentially transfer these successions of charge packets to charge sensing circuitry with differential delay. Differential delay is reduced by multiplexing in the invention, so artifacts of the line selection process in the line-transfer register, which appear in the raster-scanned video signal generated by the charge sensing circuitry, fall completely within line retrace intervals. This avoids the artifacts disrupting the picture response during line trace intervals, and it allows these artifacts to be suppressed by line retrace blanking.

DETAILED DESCRIPTION

Figure 1:
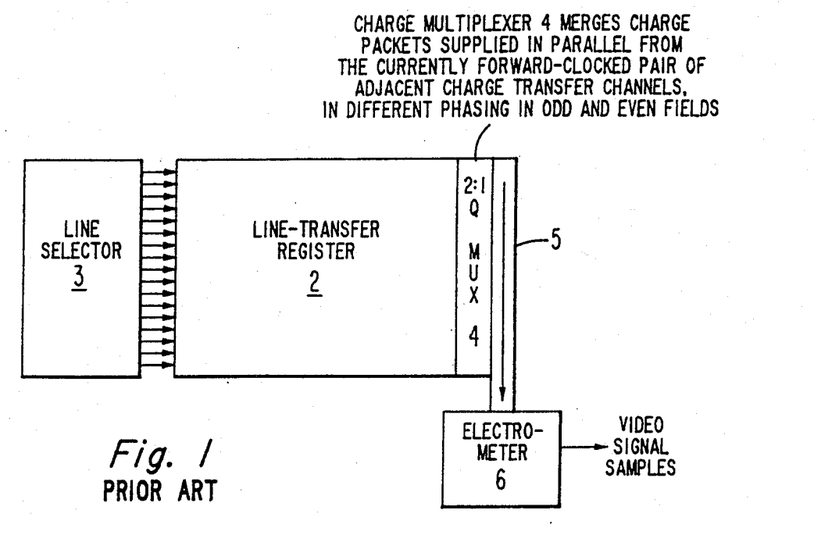
FIG. 1 is a block diagram schematic diagram of a line transfer CCD imager using a line-transfer register 2 as image register, as described by P. K. Weimer in U.S. Pat. No. 4,242,700 issued Dec. 30, 1980, entitled "LINE TRANSFER CCD IMAGERS", and assigned to RCA Corporation. This imager has an undesirable tendency to exhibit line-selection artifacts within line trace intervals, the problem which the present invention addresses. Arrows indicate direction of charge transfer in CCD shift register circuitry in the drawing.

In the FIG. 1 prior art CCD imager, a line-transfer register 2 comprises a parallel array of charge transfer channel, l in number, disposed in a substrate of semiconductive material. These charge transfer channels may be surface channels or buried channels, the latter generally being preferred because CCD's using buried channels are not affected by surface recombination noise. Since l is normally at least two hundred, these charge transfer channels are not explicitly shown in FIG. 1, so as not to clutter up the figure. But these charge transfer channels should be understood to have their lengths extending from left to right.

In a CCD imager of line transfer type the image integration process takes place within the charge transfer channels of line-transfer register 2. In solid state imagers of other types in which the invention finds use, such as the horizontal interline transfer type of CCD imager, line-transfer register 2 is used as a temporary field storage register into which charge packets are loaded during field retrace intervals from an array of photosensors (not shown in FIG. 1). The output ports of the charge transfer channels in line-transfer register 2 are in parallel alignment at the right edge of register 2 in FIG. 1. The charge transfer channels in line transfer register 2 are considered to be ordinally numbered first through $l^{th}$ in order of their disposition from the bottom of register 2 to its top as depicted in FIG. 1. Generally, in a line transfer type of imager, inverting optics are used to project the radiant energy image into line transfer register 2, so the topmost and bottom-most parts of the television picture, reconstructed from video signal samples generated by the FIG. 1 imager, will be constructed from charge packets respectively accumulated in the first and the $l^{th}$ charge transfer channels. The convention of line scan of the field of view of the camera proceeding from top to bottom is presumed to be followed. Line selector 3 supplies line selection signals for successively forward clocking the odd-numbered charge transfer channels in line-transfer register 2 during each odd-numbered image field scan, in order of progressively higher ordinal numbering. During each even-numbered field scan, line selector 3 supplies line selection signals for successively forward clocking the even-numbered charge transfer channels in line-transfer register 2, in order of progressively higher ordinal numbering. This provides line interlace from field to field in transferring, from line-transfer register 2, charge packets with amplitudes descriptive of pixel intensity.

Line selector 3 is depicted as supplying only sixteen line selection signals to line-transfer register 2, to forward clock respective ones of its charge transfer channels. But these sixteen line selection signals are to be considered representative of as many line selection signals as the number, l, of parallelled charge transfer channels in line-transfer register 2. In a CCD imager for a 525-line television standard, l is typically 480, which is too great a number of line selection signals to show in a drawing figure.

In a line transfer CCD imager as described by P. K. Weimer in U.S. Pat. No. 4,242,700, the photoconversion of the elements or pixels of a radiant energy image projected into its line-transfer register 2 takes place in the line transfer resgister charge transfer channels themselves, and in the semiconductor substrate in which they are formed. These photocharges are accumulated into charge packets in potential energy wells induced by static potentials applied to the gate electrodes crossing the line-transfer register 2 charge transfer channels that line selector 3 does not currently select for application of forward clocking signal. Irradiation may take place from the "front" surface (on which the gate electrodes used to transfer charge packets in the image register charge transfer channels are formed), particularly if the gate electrodes are transparent to the radiant energy of interest. Or if the substate of semiconductive material is thinned, irradiation may take place through the opposing, "back" surface.

Also known is another, related, interline sensor type of CCD imager which also uses a line-transfer register. However, in this related type of CCD imager photoconversion takes place in linear arrays of photoelements, either interlineated between the line-transfer register 2 charge transfer channels or disposed over them. Prior to each line-transfer register 2 charge transfer channel being forward clocked, it is loaded in parallel with charge packets from the associated line array of photoelements, responsive to the pulsing of a transfer gate between the line array of photoelements and the charge transfer channel. The invention disclosed herein is applicable whether line-transfer register 2 is in a CCD imager of the line transfer type, or is in a CCD imager of a related type.

U.S. Pat. No. 4,242,700 shows its line-transfer register 2 followed by a rank 4 of charge packet multiplexers which reduce the l parallel outputs of the line-transfer register 2 charge transfer channels to l/2 inputs for side-loading the respective successive stages of a side-loaded CCD shift register 5. CCD shift register 5 is forward clocked in synchronism with the one of line-transfer register 2 charge transfer channels that line selector 3 selects for forward clocking. The charge packets serially transfer, from the selected line-transfer register 2 charge transfer channel, through one of the charge packet multiplexers in rank 4 to side-load CCD shift register 5, through CCD shift register 5 in its forward clock direction to its output port, and to the electrometer 6. Electrometer 6 senses the amplitudes of the charge packets serially transferred to it and responds to supply video signal samples in the current or voltage regime.

Line selector 3 supplies forward clocking signal continuously, though to different pairs of adjacent charge transfer channels in the line-transfer register 2 at different times. (Discontinuously supplying forward clocking signals from line selector 3 can be done, but it is disadvantageous in that it generates more than one line selection artifact to take care of.) If the change in the application of forward clocking signal from one pair of adjacent charge transfer channels to the next pair took place at 1H intervals, the differential delay afforded to successive lines of charge packets by side-loaded CCD shift register 5 (owing to these lines of charge packets being loaded into different ones of register 5 charge transfer stages) gives rise to shear distortion in a television picture reconstructed from the video signal samples supplied by electrometer 6.

Figure 2:
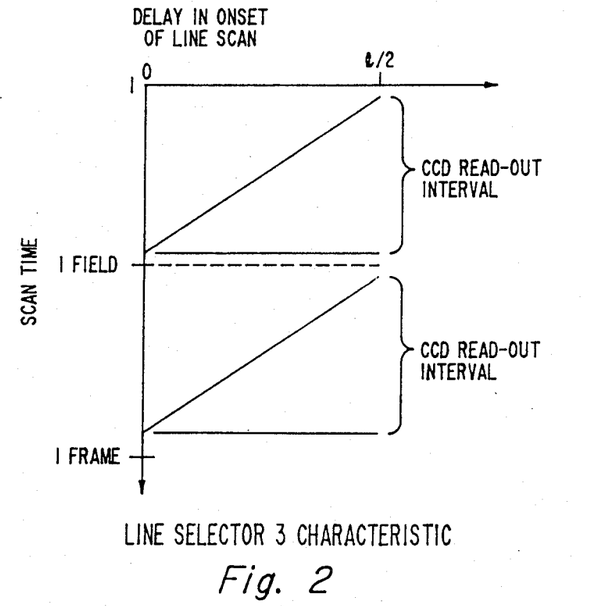
FIG. 2 depicts a characteristic of the line selector 3 used in FIG. 1 CCD imager as may be used to avoid shear distortion in its video signal.

FIG. 2 shows how the line selector 3 is made to compensate against this shear distortion. The onset of forward clocking is delayed from the normal beginning of the line scan for each line scan of the picture portions of each field. Normal beginnings of line scan would be at 1H intervals. The delay of the first row read out is made to be 1/2 forward clock cycles, to equal that delay the last line scan in the picture portion of that field experiences in its passage through the entire length of side-loaded CCD shift register 5. This delay in onset of forward clocking during first line scan is decremented with each successive line of the field. That is, the spacing in time between onsets of forward clocking of the successive lines of the field is one forward clock cycle less than the number of clock cycles in a 1H duration.

The larger number l of lines in the line-transfer imager 2 makes it difficult to show in FIG. 2 a one-half line offset in the delay of onset of line scan between the first and second fields, but one should note this. One should also be aware that the Weimer line-transfer imager described in U.S. Pat. No. 4,742,700 provides pseudo line interlace from field to field rather than true line interlace. That is, the image register is completely read out in paired rows during each field, with pair phasing staggered in alternate fields.

Consider now the extent of the line-selection artifacts in the direction of scan line in the FIG. 1 imager, assuming 480 active scan lines per frame. The charge packet multiplexers in rank 4 reduce to 240 the number of side-loaded successive charge transfer stages in CCD shift register 5. So the diagonally disposed line-selection artifacts extend 240 pixel widths in the scan line direction. If the line trace interval scan is 403 pixel widths, the present day standard, line retrace interval corresponds to about 81 pixel widths; and clearly the 240 pixel widths dimension of the diagonally disposed line-selection artifacts cannot be contained within the line retrace intervals. The diagonally disposed line-selection artifacts will extend in the line scan direction across at least two-fifths of the television picture reconstructed from the FIG. 1 CCD imager video signal samples. If 768 pixel widths are scanned in the line trace interval, line retrace interval corresponds to about 154 pixel widths; and the diagonally disposed artifacts will extend in line scan direction over only about a twelfth of the picture.

If 1536 pixel widths are scanned in the line trace interval, line retrace interval corresponds to is about 307 pixel widths. So, the line-selection artifacts will be located entirely within line retrace intervals. The problem is, if resolution in the scan line direction is increased to this degree, it is usually desirable to increase the number of scan lines to afford commensurately increased resolution in the direction perpendicular to scan line direction. As a matter of practicality, then, one must consider ways to further reduce the maximum differential delays in the side-loaded CCD shift registers used to commutate charge packets out of line transfer registers.

Figure 3:
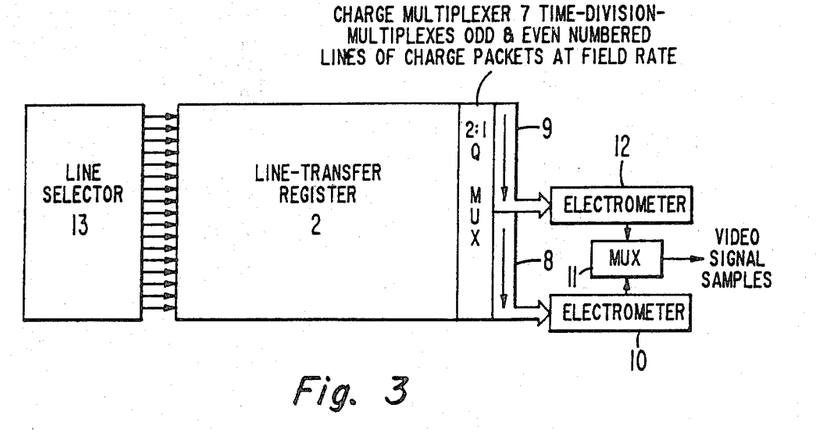
FIG. 3 is a block schematic diagram of a CCD imager embodying the invention.

FIG. 3 shows a modification of the FIG. 1 line transfer CCD imager, which differs from the FIG. 1 CCD imager as follows. Two side-loaded CCD shift registers 7, 8 are used to commutate charge packets out of the charge transfer channels of the line-transfer register 2, to shorten the extent of line-selection artifacts in the dimension along scan line. The output ports of these side-loaded shift registers 7, 8 connect to respective electrometers 9, 10; and the electrometer responses are combined by a time-division multiplexer 11. The 2:1 charge packet multiplexer 4 of Weimer is replaced by a 2:1 charge packet multiplexer 7. While the physical structure of 2:1 charge packet multiplexer 7 is in some instances essentially the same as charge multiplexer 4, its operation is very different. This comes about because a line selector 13 operates the line-transfer register 2 so as to successively forward clock pairs of adjacent charge transfer channels. Line selector 13 successively forward clocks alternate charge transfer channels in different phasing on alternate fields, thereby to generate true line interlace from field to field, rather than pseudo line interlace as done in Weimer's imager of U.S. Pat. No. 4,242,700.

Using true line interlace rather than pseudo line interlace implements the replacement, in FIG. 3, of the side-loaded CCD shift register 5 by two side-loaded CCD shift registers 8 and 9, each serving a respective half of line-transfer register 2, and each being half as long as CCD shift register 5 insofar as number of parallelly loaded successive charge transfer stages is concerned. Electrometer 6 is replaced by a pair of electrometers 10 and 11. The output ports of CCD shift registers 8 and 9, respectively, are connected to the input ports of electrometers 10 and 12, respectively. The output signals from electrometers 10 and 12 are represented in FIG. 3 as being time-division multiplexed by a multiplexer 12 to generate the video signal samples furnished as FIG. 3 CCD imager output signal.

The differential delay through each of the side-loaded CCD shift registers 8 and 9 is one half the 240-pixel-durations differential delay through side-loaded CCD shift register 5 of the FIG. 1 CCD imager. The line-selection artifacts associated with 120-pixel-durations differential delay fit within the 154-pixel-duration line retrace intervals when scan lines having 768-pixel-duration line trace intervals are used.

Figures 4, 5:
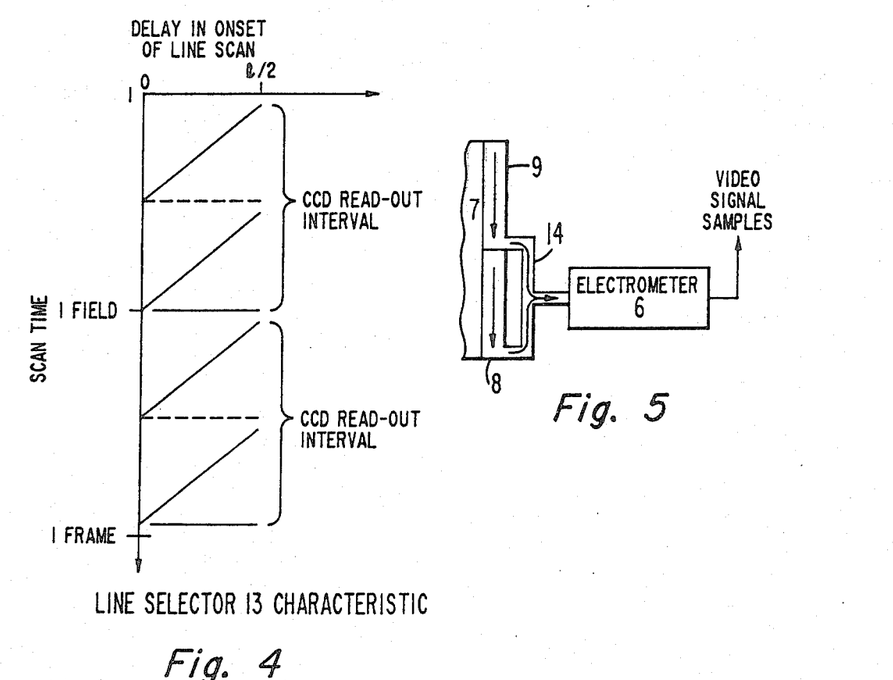
FIG. 4 depicts a characteristic of the line selector 13 in the FIG. 3 CCD imager, as may be used to avoid shear distortion.
FIG. 5 is a block diagram of a modification of the FIG. 3 CCD imager, to allow the use of a single electrometer.

FIG. 4 shows how the line selector 13 of the FIG. 3 imager is made to delay the onset of forward clocking for beginning each line scan in the picture portions of the frame, so as to avoid shear distortion in the video signal sampled from the output port of multiplexer 11. Each quarter frame has its first scan line delayed 1/4 forward clock cycles and each of the succeeding scan lines is delayed one forward clock cycle less than the preceding scan line was delayed.

One can modify the FIG. 3 CCD imager as shown in FIG. 5 so that a single charge sensing stage, electrometer 6, replaces the pair of charge sensing stages, electrometers 10 and 11. A CCD delay line structure 14 is used, in which clocked CCD delay lines connect the output ports of parallelly loaded shift registers 8 and 9 to a charge merging stage and a clocked CCD delay line connects the charge merging stage to the electrometer 6 input port. The clocked delay that structure 14 provides between each of the shift registers 8 and 9 and electrometer 6 is substantially equal to 1H, to shift the line selection artifacts to again fall within line retrace intervals. Several variants of the FIG. 3 CCD imager modified per FIG. 5, each of which embodies the invention, are possible. For example, side-loaded CCD shift register 9 can be replaced with a side-loaded CCD shift register forward clocked in opposite direction, with CCD delay line structure 14 modified to accommodate the increased span between the output ports of the side-loaded CCD shift registers. CCD delay line structures with more than two input ports can be used to convey to electrometer 6 charge packets from the output ports of a greater number of side-loaded CCD shift registers, as another example. Each of these variants will require a suitably designed line selector, supposing differential delays are to be compensated by perturbing line selection from 1H intervals, rather than using scan conversion after the CCD imager.

Figure 6:
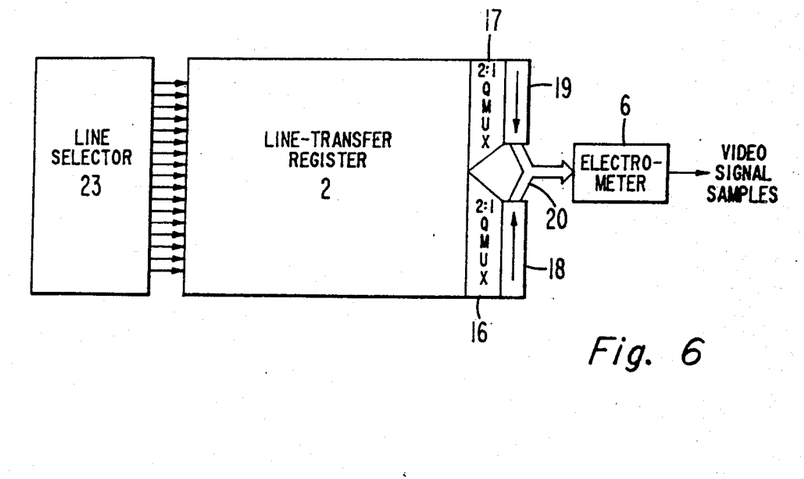
FIG. 6 is a block diagram of a CCD imager embodying the invention.

FIG. 6 CCD imager uses CCD output circuitry of a type generally known from Schottky barrier diode line arrays employed by the National Aeronautics and Space Administration in short-wavelength infrared satellite cameras and has been described by J. R. Tower in his U.S. Pat. No. 4,647,977, issued Mar. 3, 1987, entitled "A CHARGE-COUPLED-DEVICE PARALLEL-TO-SERIAL CONVERTER", and assigned to RCA Corporation.

In this variant of the FIG. 3 CCD imager the output ports of two side-loaded CCD registers 18, 19 are near the center of the parallel alignment of the output ports in the charge transfer channels in the CCD imager field-transfer register 2 and connect to the input ports of a charge packet multiplexer 20. The charge packets from the charge packet multiplexer 20 are applied to the electrometer 6. The shortened line selection artifacts fall within line retrace times, so it can be removed from the imager output video signal by line retrace blanking.

The rank 7 of charge packet multiplexers is divided into half ranks 16 and 17. Fan-in is introduced into the half ranks 16 and 17 of charge packet multiplexers. Or alternatively, short fan-in parallel transfer registers follow the charge packet multiplexers. This is done to open a space between the output ports of CCD shift registers 18 and 19, the successive charge transfer stages of which are side-loaded respectively from half rank 16 of charge packet multiplexers and from half rank 17 of charge packet multiplexers. The side-loaded CCD shift registers 18 and 19 are both forward clocked towards an axis passing through the middle of line-transfer register 2, and their output ports connect to the input port of electrometer 6 through a CCD charge merging structure 20 following closely from the output ports of CCD shift register 18 and 19. The delay through CCD charge merging structure 20 is only a few pixel durations. For example, when 768 pixels are scanned during line trace interval, when line retrace interval corresponds to 154 pixel widths, and when the number of lines 1 in the image register is 480, the CCD charge merger stage 20 cannot have delay longer than the time to scan 34 pixel widths, which is easily arranged.

Figure 7:
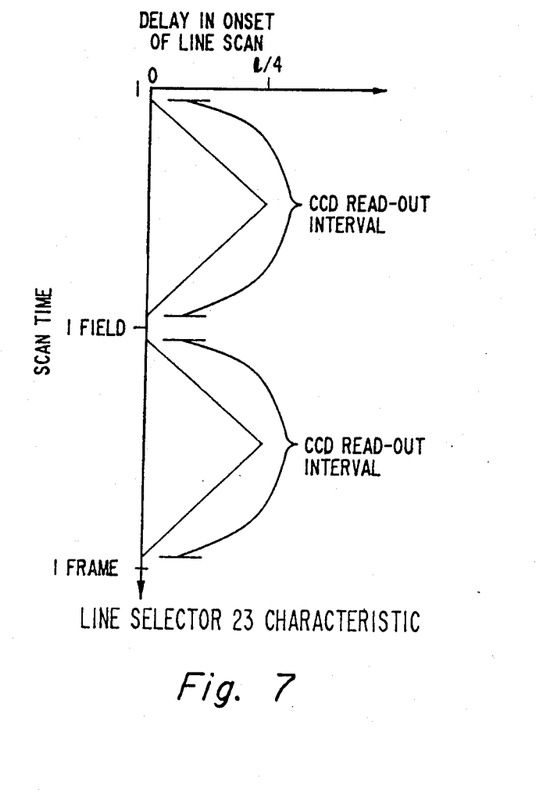
FIG. 7 depicts a characteristic of the line selector in FIG. 6 CCD imager, as may be used to avoid shear distortion.

FIG. 7 shows how the line selector 23 of the FIG. 6 imager can be made to delay the onset of line scan in the picture portions of the frame, so as to avoid shear distortion.

The FIG. 6 imager architecture tends to have a minor problem because of charge transfer in side-loaded CCD register 18 being in the direction of increasing line-transfer register 2 charge transfer channel numbering, rather than the direction of such numbering decreasing, when the line selector 23 operates in accordance with the FIG. 7 characteristic. The last charge packet descriptive of the preceding line overscan will still be in the charge transfer stage of CCD shift register 18 that is then to be side-loaded with the first charge packet descriptive of the succeeding line scan. The charge packets in line overscan contain transfer smear generated by a time-delay-and-integrate process. This tends to botch the first leftmost pixel in each line trace interval in the top half of a television picture from FIG. 3 camera, supposing that the line-transfer imager receives the image right up to its rightmost edge in FIG. 3. This problem with clocking the side-loaded CCD shift register 18 in the direction of increasing line number evaporates if the charge transfer channels in the image register (line-transfer register 2 in a line transfer imager) are extended by at least one charge transfer stage which is not illuminated by usable image, since the botched pixels will be outside usable image and will subsequently be discarded during normal line retrace blanking.

The extension of line-transfer register 2 by a few extra charge transfer stages is generally desirable for other reasons. A few gate electrodes isolation between the continuously forward-clocked side-loaded output CCD shift register(s) and the portion of the line-transfer register 2 holding image samples is desirable, particularly in a line-transfer imager where image integration is carried out directly in register 2. The side-loaded CCD shift registers 5, 8, 9, 18, 19, etc. are preferably shielded from illumination to eliminate the generation of transfer smear in them. Light tends to enter at an angle under the edge of such a shield, however. To forestall transfer smear generation completely by preventing these side-loaded CCD shift registers still receiving some illumination, then, it is desirable to extend the edges of their light shields over a few of the charge transfer stages preceding the points at which these CCD shift registers are side-loaded.

Looking back on the CCD imagers thusfar described, two different mechanisms for spatially multiplexing the line-transfer register output ports are responsible for shortening the differential delay through the side-loaded CCD shift registers. One way relies on the replacement of the single side-loaded CCD shift register with a plurality of side-loaded CCD shift registers of shorter length. The other way is implemented by the 2:1 multiplexing down of charge transfer channels, effected by the charge packet multiplexers connected after the output ports of the charge transfer channels in line-transfer register 2, employed for obtaining field-to-field line interlace. It should be understood that these mechanisms for shortening the differential delay reduce differential scan-line delay independently of each other.

Figure 8:
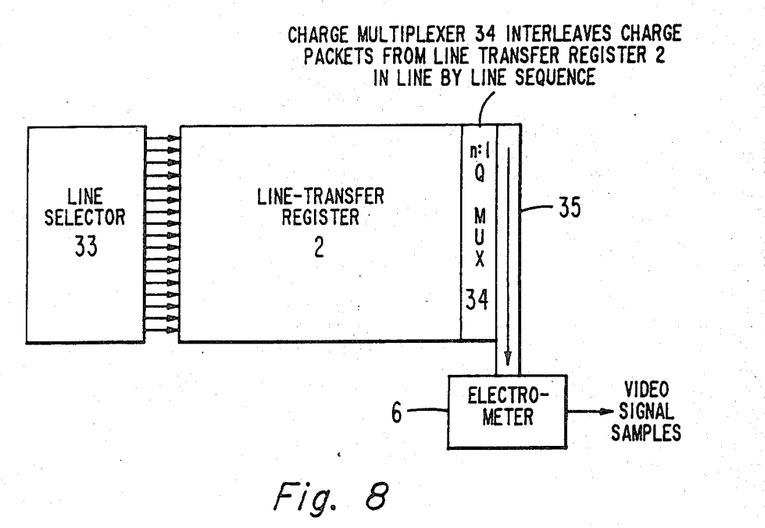
FIG. 8 is a block schematic diagram of a CCD imager embodying the invention.

FIG. 8 CCD imager uses only one side-loaded CCD shift register 25 to commutate charge packets out of its line-transfer register 2. Still, the number of charge transfer stages in the side-loaded CCD shift register 35 is sufficiently small, that the differential delay shift register 35 causes is shorter than line retrace interval. To do this, the output ports of line-transfer register 2, 1 in number, are apportioned into contiguous groups of n contiguous output ports each, n being a integer larger than two. Then a respective charge packet multiplexer time-division-multiplexes among the n output ports of each group to generate one of the signals, 1/n in number, used to side-load CCD shift register 25. The side-loaded CCD shift register 35 is connected at its output port to the input port of electrometer 6. The extent of the line-selection artifacts caused by differential delay through the CCD shift register 35 is short enough to fall entirely within line retrace intervals, so it can be removed by line retrace blanking. Suppose FIG. 8 CCD imager spatially multiplexes the line-transfer register 2 rows in groups of four. The rank 34 of charge packet multiplexers in FIG. 8 CCD imager, which spatially multiplexes the line-transfer register 2 rows in groups of four, side-loads a CCD shift register 35 that has a differential delay of 1/4, half that of the FIG. 1 CCD imager side-loaded CCD shift register 5, which keeps the line selection artifacts within the line retrace intervals.

A line selector 33 controls the selective forward clocking of line-transfer register 2 in the FIG. 8 CCD imager. The onset of forward clocking of the first pair of line-transfer register 2 rows successively read out of register 2 in each field is delayed 1/4 pixel scan durations from normal beginning of line scan. The onset of forward clocking of each succeeding pair of line-transfer register 2 rows is delayed from normal beginning of line scan by one less pixel scan duration than the preceding pair. Other arrangements for using four CCD shift registers side-loaded from line-transfer register 2 are possible, of course.

The operation of the charge packet multiplexers in the FIG. 8 CCD imager differs from the operation of the charge packet multiplexers in Weimer's FIG. 1 CCD imager. Weimer executes charge packet multiplexing solely by temporally interleaving pixels from two adjacent rows in line-transfer register 2 to generate a scan line. Line-transfer register 2 is made to have 480 rows. These rows are pairwise selected from forward clocking, with pair phasing alternating from field to field to provide line interlace. The charge packets successively transferred from the pair of selected rows are combined by the respective charge packet multiplexer in rank 34 serving, during that field, the two rows of line-transfer register 2 selected for forward clocking. The combining of the charge packets could be by simple summation, but this destroys resolution in the direction of line scan. Preferably the combining of the charge packets is done by interleaving them in time. The combining of charge packets results in 240 lines to be read out in each field. So the side-loaded CCD shift register 5 has to have 240 charge transfer stages therein, and a 240 pixel scan duration differential delay will arise in CCD register 5. Since the Weimer charge packet multiplexer scheme is integrally tied up with the provision of line-to-line interlace there is no possibility of more than a 2:1 reduction in the number of charge transfer stages in the side-loaded CCD shift register 5 or the plurality of shorter CCD shift registers used in place of CCD shift register 5.

Charge packet multiplexing that can afford a greater reduction (e.g., 4:1) in this number of charge transfer stages in the parallelly loaded CCD shift register(s) is provided in the FIG. 8 CCD imager by temporally interleaving on a scan line by scan line basis, rather than a pixel by pixel basis. Line-transfer register 2 rows are successively grouped in contiguous groups of, say, four successive rows. The output ports of the rows in each group connect to one of the charge packet multiplexers in the rank 34 of charge packet multiplexers. Each charge packet multiplexer may be a short CCD shift register having a charge transfer channel wide enough at its input port to connect across the parallelled output ports of the charge transfer channels of the associated rows of line-transfer register 2. The output port of the charge transfer channel of this short CCD shift register side-loads a respective one of the charge transfer stages of the CCD shift register 35. The short CCD shift register acts as a charge packet multiplexer, owing to the selective forward clocking of the line-transfer register 2 rows loading into it. The short CCD shift register may progressively narrow from its input port to its output port, to provide a "charge funnel", to facilitate the side-loading of a polyphase CCD shift register 35.

The CCD imagers of FIGS. 3, 6 and 3 modified per FIG. 5 can be modified to replace the rank 4 of charge packet multiplexers operating per the FIG. 1 CCD imager with charge packet multiplexers operating to time-division multiplex on a scan line by scan line basis. Such modifications result in further embodiments of the present invention. Time-division multiplexing on a scan line by scan line basis in effect allows one to use one shortened-length side-loaded CCD shift register in place of a multiplicity of them. The FIG. 8 CCD imager lays out very well on the substrate of semiconductive material, as may be discerned by one skilled in the art of CCD layout, and where the imager is read out in real time is the preferred line transfer CCD imager architecture.

Figure 9:
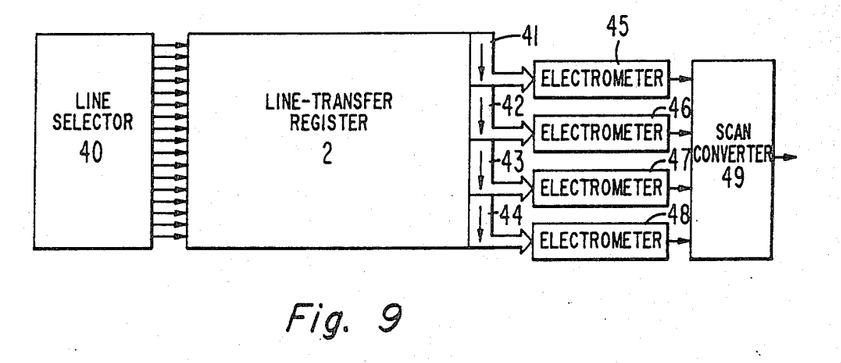
FIG. 9 is a block schematic diagram of a CCD imager embodying the invention.

FIG. 9 CCD imager exemplifies CCD imagers which embody the present invention to facilitate parallel-in-time read-out of different portions of line-transfer register 2. The rows in line-transfer register 2 are divided into four groups of contiguous rows. A line selector 40 successively selectes the respective rows in each of the four groups which are to be transferred from line-transfer register 2 in four parallel-in-time streams of sequentially supplied charge packets. Each stream of charge packets is used to side-load the one of the charge transfer stages of a respective one of CCD shift registers 41, 42, 43 and 44 corresponding to the row in line-transfer register 2 supplying that stream of charge packets. CCD shift registers 41, 42, 43 and 44 have respective output ports respectively connecting to the respective input ports of electrometers 45, 46, 47 and 48. The forward clocking of the four simultaneously selected rows in line-transfer register 2, of CCD shift registers 41-44 and of electrometers 45-48 is at one-quarter the pixel scan rate of video signal samples supplied by a scan converter 49 responsive to the output responses of electrometers 45-48.

Even in such expanded-real-time operation, the reduction in the number of side-loaded earlier charge transfer stages in CCD shift registers 41-44 in accordance with the invention shortens the extent of the line selection artifacts in the direction of line scan, so they fit into line retrace intervals as defined in the lower data rate.

Line selector 40 comprises four component line selectors, each serving a respective group of the line-transfer register 2 rows and being operated in synchronism with the others. One may arrange for line selection to proceed at intervals other than 1H multiplied by the number of groups in line-transfer register 2, for the purpose of compensating against shear distortion due to differential delay in the side-loaded shift registers (i.e. 41-44). However, it is usually more convenient to compensate against shear distortion in the scan converter 49.

Figure 10:
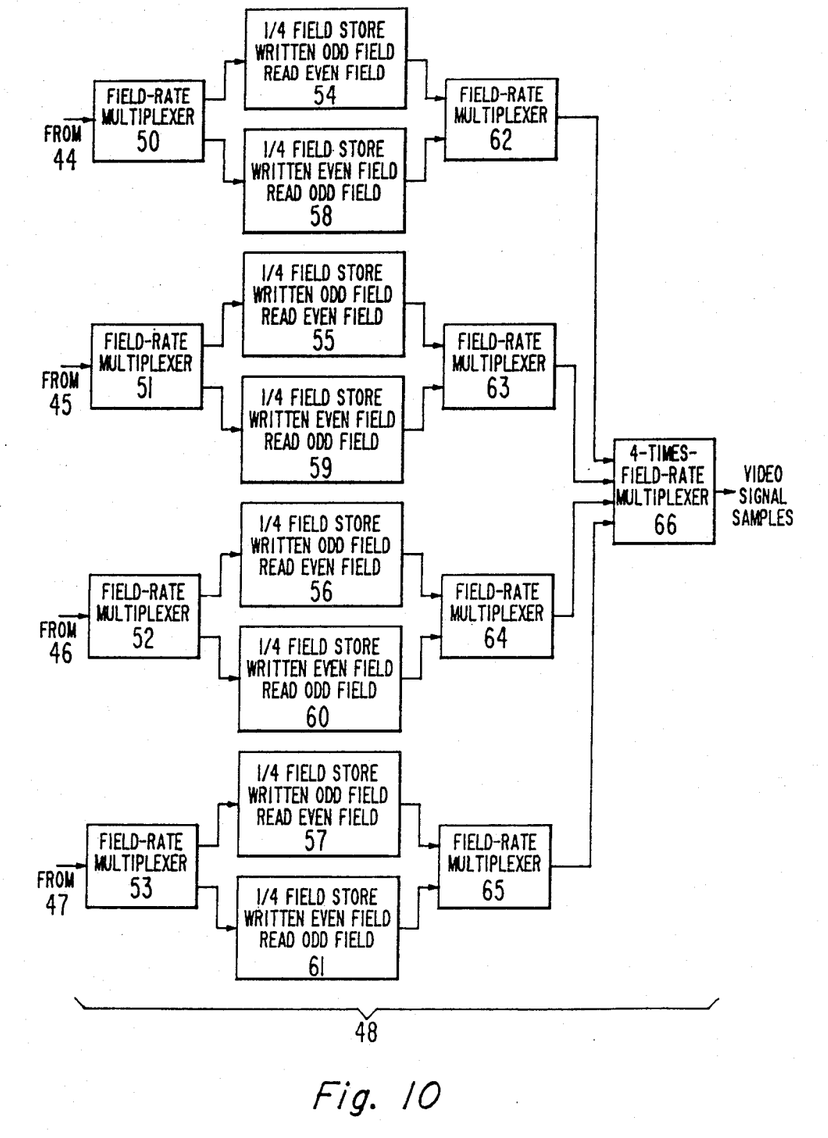
FIG. 10 is a block diagram schematic diagram of a scan converter for use with the FIG. 9 CCD imager to convert its four electrometer output signals to standard scan rates.

FIG. 10 shows a form scan converter 49 may take. The output responses of electrometers 45, 46, 47 and 48 are multiplexed to write different ones of paired quarter-field stores on odd-numbered fields than they do on even-numbered fields, assuming fields to be successively ordinally numbered. Electrometers 45, 46, 47 and 48 are shown as being multiplexed by field-rate multiplexers 50, 51, 52 and 53, respectively, to write quarter field stores 54, 55, 56 and 57, respectively, during odd fields and to write quarter field stores 58, 59, 60 and 61 during even fields. Assuming quarter field stores 54-61 to be random access memories (RAM's) the field-rate multiplexers 50, 51, 52 and 53 can be generated by applying the least significant bit of binary field-numbering as a write selection signal to quarter-field stores 54-57 and its complement as a write signal to quarter-field stores 58-61.

Each of the quarter field stores 54-61 has a number of successive scan lines stored therein addressable by respective row number and by pixel number in the row. Pixel addressing increments from the beginning of received image samples, and the start of pixel addressing is offset from 4H intervals accordingly to compensate against shear distortion during the subsequent reading of the quarter-field store. The set of quarter-field stores 54, 55, 56, 57 or 58, 59, 60, 61 selected for writing in a field are written parallelly in time.

The quarter-field stores in the other set are read serially in time, sequentially in order of their identification number, or call-out, in FIG. 10. Each quarter-field store is read a row at a time with its individual pixels read serially at full pixel scan rate, with the first pixel of successive lines being read out on 1H intervals. This read-out scheme is schematically shown as being implemented with field-rate multiplexers 62-65 selecting the set 54, 55, 56, 57 or 58, 59, 60, 61 to be read and four-times-field-rate multiplexer 66 selecting the particular quarter field store in the set whose read out is to be used to supply video signal samples. In practice, with RAM's the read-out multiplexing is accomplished by proper application of read selection signals to quarter-field stores 54-61. Read selection signals for quarter-field stores 58-61 can be generated by logic AND of the least significant bit of successive binary field-numbering and each of a decoder outputs for a respective one of the conditions of two most significant bits of successive scan line count within the field. Read selection signals for quarter-field stores 54-57 can be generated by logic AND of each of the same decoder outputs and the complement of the least significant bit of successive binary field-numbering.

The FIG. 10 type of line transfer CCD imager becomes of particular interest as the number of rows in the line-transfer register 2 becomes large and the number of pixels per row also becomes large, because the charge transfer rates required to read out an image in short enough time to avoid visible flicker become so high that charge transfer efficiency becomes a serious problem for the large number of charge transfers involved.

The FIG. 9 imager may alternatively be operated so as to forward clock successively selected rows of its line transfer register 2 at pixel-scan rate. The four component line selectors in line selector 40 are not operated parallelly in time, but rather are operated serially in time. Scan converter 49 is replaced by a simple voltage multiplexer, and the storage of samples required in a scan converter 49 is avoided.

The type of imager described in the previous paragraph may be modified for use in tracking systems, to reduce the time delay in tracking a target. After an image has been initially acquired and a target location has been identified, it is no longer necessary to scan the whole field of view of the image serially line-by-line and to suffer the time delay in tracking that is associated with this mode of scanning the full field of view. Just those portions of the image identified as containing target information may be scanned, using only a selected one (or ones) of the component line selectors in line selector 40 independently of the non-selected component line selectors, and utilizing the response of a selected one of the electrometers 45, 46, 47, 48 (or time-division-multiplexing among selected ones of those electrometer responses). Or, as in the FIG. 10 imager one can arrange to operate the component line selectors in line selector 40 in parallel, better to reduce tracking delay. Tracking delay can be reduced in still greater degree by increasing the number of component line selectors comprising line selector 40, and by correspondingly increasing the number of electrometers and the number of CCD shift registers commutating charge packets to the electrometers from image register 2.

Figure 11:
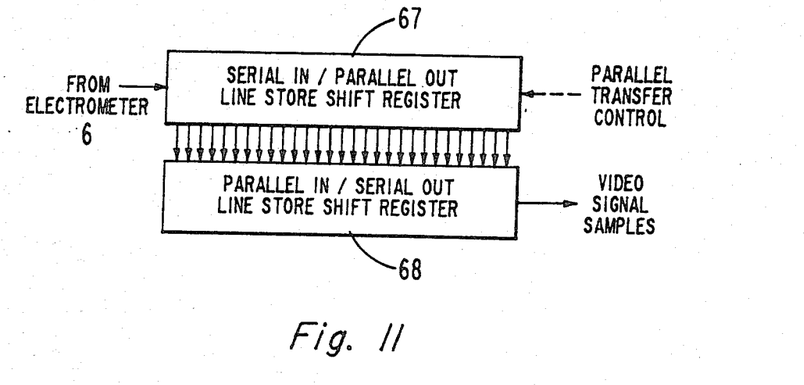
FIG. 11 is a block schematic diagram of a scan converter than can be used with the CCD imagers of FIGS. 3, 6, 8 and 3 modified per FIG. 5, which compensates against shear distortion when their line selectors perform line selection on exact 1H intervals.

FIG. 11 shows representative scan converter apparatus for removing shear distortion from the output signals of CCD imagers that differ from the CCD imagers of FIGS. 3, 6, 8, and 3 modified per FIG. 5 in that a line selector is used which begins on regular 1H intervals the forward clocking of each selected row in line-transfer register 2. Two line stores are required for the scan conversion, and FIG. 11 shows them as being a serial-in parallel-out shift register 67 and a parallel-in series-out shift register 68. Output signal samples from electrometer 6 serially load shift register 67. When a scan line of pixel samples has been entered into the shift register 67, as may be predicted by counting from regular 1H intervals at pixel scan rate the delay the previous scan line encounters on its route to electrometer 6, a parallel transfer control signal is generated. The line of samples in the succession stages of shift register 67 is transferred in parallel into respective ones of the successive stages of shift register 68. So, this parallel transfer takes place during line retrace interval of the raster-scanned sample-data video signal that shift register 68 is to provide at its output port. Then, during the following line trace interval shift register 68 is forward clocked at pixel scan rate to read out the transferred line without shear distortion.

The FIG. 11 apparatus is better implemented in digital form when external to the imager die, with an analog-to-digital converter connecting electrometer 6 output port to the input port of the serial-in/parallel-out line store shift register 67. Circuitry similar to that of FIG. 11, but operating on an analog sample basis in the charge regime, can be constructed in CCD form on the imager die and interposed before electrometer 6. As an alternative, if the line scan converter is to be located off die, it can be constructed using a pair of random access memories, alternately written and read, with appropriate pixel address offsets between writing and reading.

Brief commentary will now be made on the forms the line selectors 3, 13, 23 33 and the component line selectors within 40 may take in general. Each can be built around a CCD shift register having a logic ONE condition successively advanced through its stages. The position of the ONE condition is detected at the gate electrode of one of a plurality of insulated-gate field-effect transistors, one per charge transfer stage of the CCD shift register. These FET's are in transmission gate connections for applying forward clocking signals to respective line-transfer register 2 rows. The control on the beginning of forward clocking in successive rows of the line-transfer register 2 is exercised by changing the length of the intervals between shift pulses to the CCD shift register from the clocking circuitry that controls the operation of the CCD imager. These lengths of interval can be accurately measured using counters that count pulses generated at pixel scan rates by the clocking circuitry.

Figure 12:
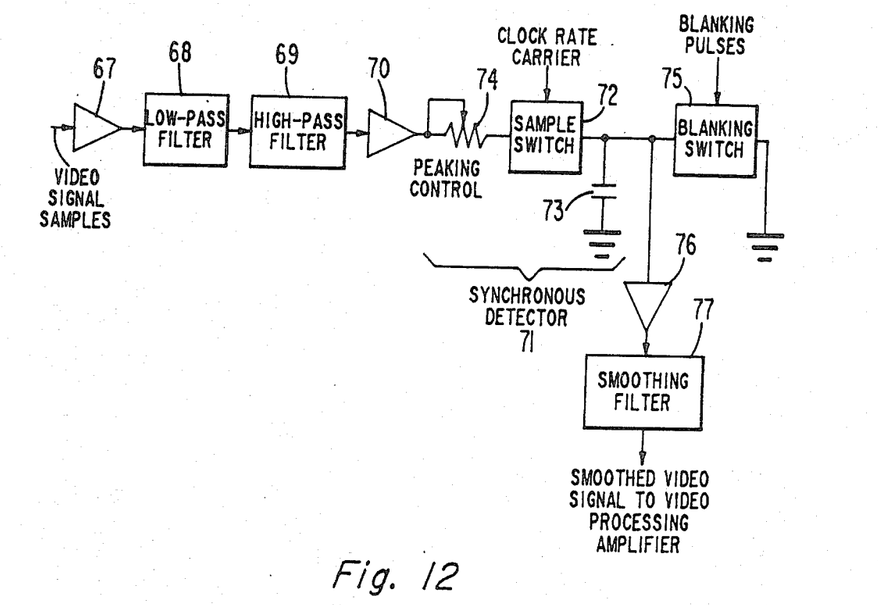
FIG. 12 is a block diagram of circuitry following the CCD imager as shown in FIGS. 3, 6, 8 and 3 modified per FIG. 5, which circuitry includes the line retrace blanking that suppresses the line-selection artifacts in video signals supplied to the video processing amplifier.

FIG. 12 shows circuitry that utilizes the video signal samples generated by the CCD imagers described above. This circuitry is of the type currently preferred for use after floating diffusion electrometers. In the past the video signal samples from the CCD imager were simply sampled at pixel scan rate and held, to increase the recovery of the baseband spectrum with which the signal and to suppress harmonics of the sampling frequency. However, there is a strong 1/f noise component in the recovered signal. In the FIG. 10 circuitry, the video signal samples are high-pass filtered to suppress the lower frequencies in the baseband spectrum with which 1/f noise is intermixed, and then the filtered signal is synchronously detected with carrier frequency corresponding to forward clocking rate in the CCD imager. This heterodynes the first harmonic spectrum of the video signal samples to baseband spectral components free of 1/f noise. This is followed by line retrace blanking which implements the object of the present invention, the suppression of line selection artifacts in video signal supplied from a line transfer type CCD imager.

More particularly, the video signal samples from the CCD imager are applied to a voltage-follower amplifier 67 to obtain a low-impedance source for driving a cascade connection of a low-pass filter 68 and high-pass filter 69. High-pass filter 69, typically a simply RC filter comprising a series-arm capacitor and a shunt-leg resistor, suppresses 1/f noise and the accompanying lower frequencies in the baseband spectrum. Low-pass filter 68, typically a simple RC filter comprising a series-arm resistor and shunt-leg capacitor, rounds off transient peaks. This reduces the need for dynamic range in a voltage amplifier 70, which provides about ten-times voltage gain following the cascade connection of filters 68 and 69. Synchronous detection of the filtered and amplified video signal samples is done in a synchronous detector 71. Synchronous detector 71 of a type which feeds through to its output the remnant high frequencies left in the baseband by filters 68 and 69, to provide high frequency video signal peaking by augmenting the baseband spectrum signals provided by the heterodyning of the first harmonic spectrum with clock rate carrier in the synchronous detection. Synchronous detector 71 is shown as being simply in series-arm sample switch 72 and a shunt-leg hold capacitor 73. Sample switch 72 typically is provided by an insulated-gate field effect transistor in transmission gate connection. A variable resistance 74 padding the sample switch conductance controls the degree of high frequency video peaking. During line retrace intervals blanking pulses applied to a blanking switch 75 cause hold capacitor 73 to be discharged to ground reference, which is nominal black level. This dc clamping procedure disposes of line selection artifact response, completing the implementation of the present invention. The video signal recovered by synchronous detector 71 and blanked during line retrace intervals by blanking switch 75 is applied to a buffer amplifier 76, which may be a voltage-follower for example. Buffer amplifier 76 response is supplied to a smoothing filter 77 to remove components above video signal baseband, and the smoothed video signal is supplied to a video processing amplifier (not shown) for insertion of synchronizing signals.

Figure 13:
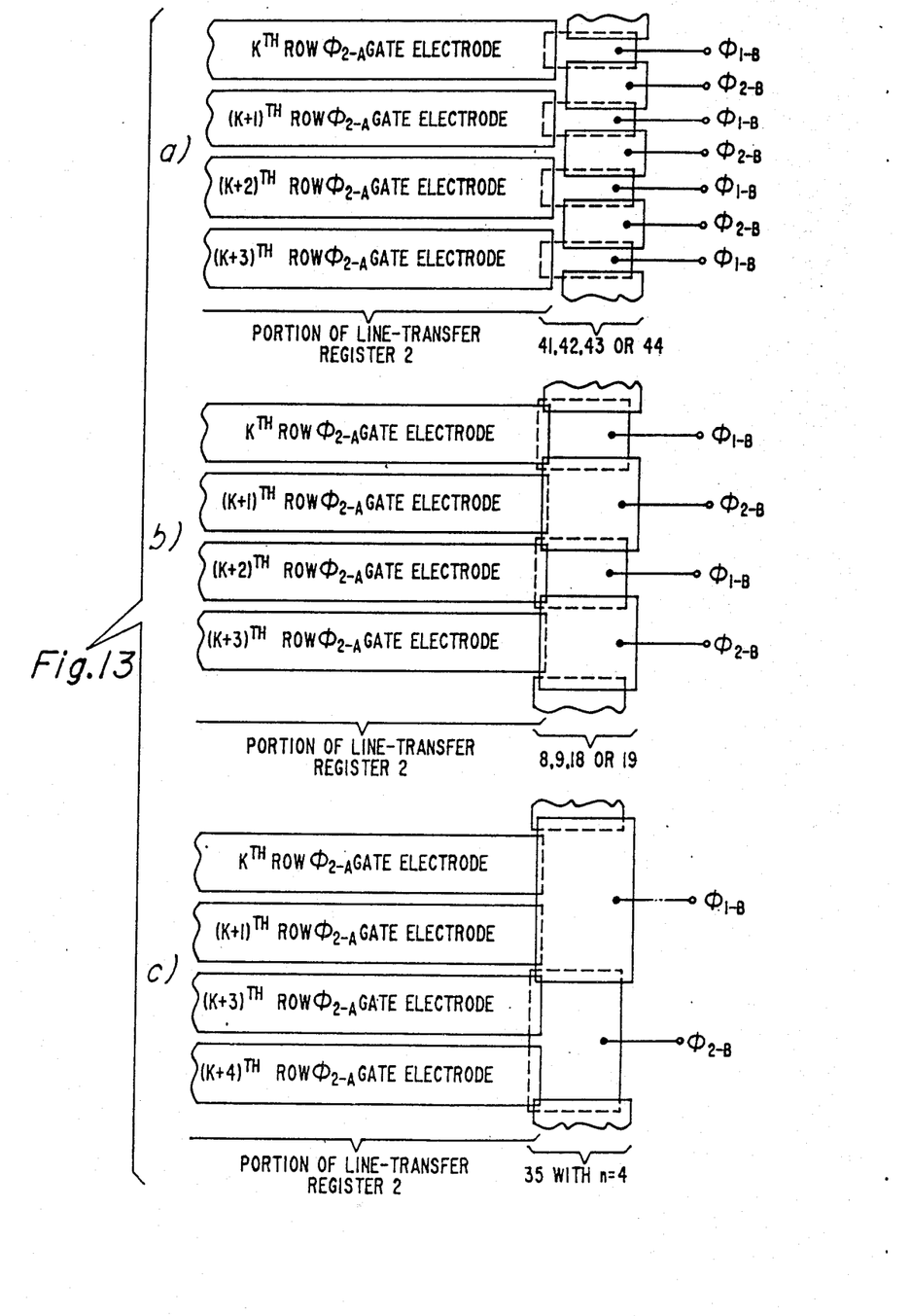
FIG. 13 is a diagram of alternative ways the charge transfer channels of the line-transfer register can sideload an output CCD shift register in a CCD imager embodying the invention, to facilitate charge multiplexing.

FIG. 13 is referred to in considering in greater detail the charge packet multiplexers 7, 15, 16, 34. FIG. 13(a) shows how a line-transfer register is arranged to side-load a two-phase-clocked output CCD shift register when charge packet multiplexing is not used (e.g., per FIG. 9); FIGS. 13(b) and 14(c) show how a line-transfer register is arranged to side-load a two-phase clocked output CCD shift register when charge packet multiplexing of 2:1 (e.g. as in FIGS. 3 and 6) and 4:1 (e.g., as in FIG. 8), respectively, are used. Line-transfer registers are easiest to clock in two phases, with the fingers of a comb gate electrode structure receptive of a first phase of clocking voltage $\phi_{1-A}$ extending across the charge channels, and with overlying gate electrodes running the lengths of respective charge transfer channels selectively receptive of a second phase of clocking voltage, $\phi_{2-A}$. To simplify FIG. 13 the gate electrodes receptive of $\phi_{1-A}$ clocking voltage phase are not shown, and only the gate electrodes running the lengths of respective charge transfer channels are shown. Those gate electrodes overlying the charge transfer channels holding the $k^{th}$, $(k+1)^{th}$, $(k+2)^{th}$ and $(k+3)^{th}$ rows of charge packets are shown.

In FIG. 13(a) the pitch of the two-phase side-loaded shift register 41, 42, 43 or 44 equals the row-to-row spacing in line transfer register 2. $\phi_{1-A}$ and $\phi_{2-B}$ forward clocking voltage phases in the side-loaded shift register are invariably synchronous with the $\phi_{1-A}$ and $\phi_{2-A}$ forward clocking voltage phases in the line-transfer register 2. There is no charge packet multiplexing.

In FIG. 13(b) the pitch of the two-phase side-loaded shift register 8, 9, 18 or 19 is one-half the row-to-row spacing in line-transfer register 2 to effect 2:1 charge packet multiplexing. When one of the $k^{th}$, $(k+2)^{th}$, etc. set of alternate rows is being forward clocked into the side-loaded CCD shift register 8, 9, 18 or 19, the $\phi_{1-A}$ and $\phi_{2-B}$ phases of the CCD shift register forward clocking voltages will be synchronous with the $\phi_{1-A}$ and $\phi_{2-A}$ phases, respectively, of the row forward clocking. When one of the $(k+1)^{th}$, $(k+3)^{th}$, etc. set of alternate rows is being forward clocking into the side-loaded CCD shift register 8, 9, 18, or 19, the $\phi_{1-B}$ and $\phi_{2-B}$ phases of the CCD shift register forward clocking voltages will be synchronous with the $\phi_{2-A}$ and $\phi_{1-A}$ phases, respectively, of the row forward clocking.

FIG. 13(c) shows the pitch of the side-loaded CCD shift register 35 chosen to be one-quarter the row-to-row spacing in line-transfer register 2 in order to effect 4:1 charge packet multiplexing. The $\phi_{1-B}$ and $\phi_{2-B}$ phases of forward clocking voltage for CCD shift register 35 are chosen to be in phase with or in anti-phase with the $\phi_{1-A}$ and $\phi_{2-A}$ phases of forward clocking voltage in line-transfer register 2, depending on which row of register 2 is being forward clocked. The choice is made to provide for continuous forward clocking through register 2 and CCD shift register 35.

The charge packet multiplexing can be carried to the point where gate electrode length in the parallelly loaded CCD shift register begins to limit frequency response owing to incompleteness of individual charge packet transfers. If line-transfer register 2 channel width is 13.5 microns, the FIG. 13(a) side-loaded CCD shift register will operate at clock rates up to more than 50 MHZ. The CCD gate electrode length of 27 microns for FIG. 13(b) side-loaded shift register will operate at clock rates up to at least 15 MHZ. The forty micron gate length for the FIG. 13(c) side-loaded shift register will provide adequate video bandwidth for broadcast television.

What is claimed is:

1. A method for preventing line selection artifacts from occurring in the line trace portions of the video signal samples supplied from a CCD imager of the type using side-loaded CCD shift register circuitry for providing a plurality of charge transfer paths, from the output ports of a parallel array of the charge transfer channels in a line-transfer register, to the input port of a charge sensing stage generating said video signal samples as responses at its output port, said method comprising the steps of:

introducing respective charge packet contents into the charge transfer channels of said line-transfer register during times that those charge transfer channels are not forward clocked;

selectively forward clocking said charge transfer channels over respective intervals of time sufficient to serially transfer their charge packet contents to their output ports; and keeping the delay of said video signal samples attributable to side loading said CCD shift register circuitry, short enough that said delay does not exceed the length of a line retrace interval.

2. A method as set forth in claim 1 further including the step of:

displacing in time the respective intervals of time over which the charge transfer channels in said line-transfer register are selectively forward clocked, so as to provide at 1H intervals the responses said charge sensing stage provides to the charge packet contents of those charge transfer channels.

3. A method as set forth in claim 1 further including the steps of:

beginning the selective forward clocking of charge transfer channels in said line-transfer register at 1H intervals, and scan converting the response of said charge sensing stage to remove shear distortion.

4. A method as set forth in claim 1, wherein said step of keeping the delay attributable to side loading said CCD shift register circuitry from exceeding a line retrace interval includes the steps of:

operating groups of the parallel array of charge transfer channels in said line-transfer register as subarrays of said parallel charge transfer channels;

operating said CCD shift register circuitry to accept in separate respective portions thereof charge packets from said subarrays of charge transfer channels; side loading respective portions of said CCD shift register circuitry, each respective portion being sequentially side-loaded in respective shift register stages thereof from the output ports of the charge transfer channels in a different one of said subarrays; and time-division-multiplexing, within said CCD shift register circuitry, the unloading of the charge packet contents of those separate respective portions of said CCD shift register circuitry for said few subarrays of charge transfer channels serially to the input port of said charge sensing stage.

5. A method as set forth in claim 1, wherein said step of keeping the delay attributable to side loading said CCD shift register circuitry from exceeding a line retrace interval includes the steps of:

operating groups of the parallel array of charge transfer channels in said image register as subarrays of said parallel charge transfer channels;

time-division-multiplexing the transferred charge packet contents of the charge transfer channels in each subarray with a respective charge packet multiplexer to generate a single respective charge packet train in which scan lines of charge packets are time-interleaved; and side loading a respective stage in said CCD shift register circuitry with each of said charge packet trains.

6. A method as set forth in claim 1, wherein said step of keeping the delay attributable to side loading said CCD shift register circuitry from exceeding a line retrace interval includes the steps of:

operating groups of the parallel array of charge transfer channels on said image register as subarrays of said charge transfer channels;

operating each subarray of charge transfer channels as sub-subarrays of said charge transfer channels;

time-division-multiplexing with a charge packet multiplexer the transferred charge packet contents of the charge transfer channels in each sub-subarray with a respective charge packet multiplexer to generate a single respective charge packet train in which scan lines of charge packets are time-interleaved;

operating said CCD shift register circuitry to accept in separate respective portions thereof charge packets from said subarrays of charge transfer channels; said loading during respective time intervals the respective portions of said CCD shift register circuitry, each respective portion being sequentially side loaded in respective shift register stages thereof by respective charge packet trains originating from charge transfer channels in a different one of said subarrays; and time-division-multiplexing, within said CCD shift register circuitry, the unloading of the charge packet contents of the respective portions of said CCD shift register circuitry serially to the input port of said charge sensing stage.

7. A CCD imager comprising:

a line-transfer register having therein a parallel array of charge transfer channels with respective output ports in parallel alignment, the output ports being grouped into a plurality n in number of groups, the output ports in each group being contiguous with each other;

line selection means for selectively forward clocking the charge transfer channels in said line-transfer register;

n CCD shift registers ordinally numbered first through $n^{th}$, each selectively side loaded from the output ports of the line-transfer register charge transfer channels in a different group, and each provided with an output port at an end thereof; and charge sensing means responding to charge packets supplied thereto from the output ports of said n CCD shift registers to generate video output signal samples.

8. A CCD imager as set forth in claim 7 wherein the number of charge transfer channels in said line-transfer register is l, the number of pixels scanned per line trace interval is m, and n is chosen at least as large as the ratio of l times the duration of line trace interval to m times duration of line retrace interval.

9. A CCD imager as set forth in claim 8 wherein n is at least as large as 5 l/m.

10. A CCD imager as set forth in claim 8 wherein said charge sensing means includes:

an electrometer with an input port and an output port,

CCD shift register connections of the output ports of each of said first through $n^{th}$ CCD shift registers to the input port of said electrometer for providing an overall delay from the output ports of the charge transfer channels of said line-transfer register to the input port of said electrometer falling between a length of time $D_1$ and a second length of time $D_2$ where $D_2$ is a positive integer times 1H and where $D_1$ is shorter than $D_2$ by a line retrace interval, 1H being the combined duration of a line trace interval and a line retrace interval.

11. A CCD imager as set forth in claim 8 wherein said charge sensing means includes:

n electrometers, having respective input ports connected to respective ones of the output ports of said n first through $n^{th}$ CCD shift registers, and having respective output ports; and a time-division-multiplexer for selecting output video signal samples from the one of said n electrometers currently receiving charge packets from a charge transfer channel of said line-transfer register.

12. A CCD imager as set forth in claim 8 wherein said line selection means includes:

means for simultaneously selectively forward clocking n charge transfer channels in said line-transfer register, each having its output port in a different one of said groups—and wherein said charge sensing means includes:

n electrometers, having respective input ports connected to respective ones of the output ports of said first through $n^{th}$ CCD shift registers, and having respective output ports; and a scan converter receptive of video output samples from the output ports of the n electrometers, of a type for placing the video output samples into raster scan order free from shear distortion.

13. A CCD imager comprising:

a line-transfer register having therein a parallel array of charge transfer channels with respective output ports in parallel alignment, the output ports being grouped into a plurality p in number of groups, each group containing at least two contiguous output ports;

line selection means for selectively forward clocking the charge transfer channels in said line-transfer register;

a plurality p of charge packet multiplexers, each charge packet multiplexer having a plurality of input ports to which the output ports of a respective group of said line-transfer register charge transfer channels respectively connect and having an output port, said charge packet multiplexers being grouped into a plurality n in number of groups;

n CCD shift registers, each ordinally numbered first through $n^{th}$, selectively side loaded from the output ports of a different group of the charge packet multiplexers, and each provided with an output port at an end thereof; and charge sensing means responding to charge packets supplied thereto from the output ports of said first through $n^{th}$ CCD shift registers to generate samples of the video output signal.

14. A CCD imager as set forth in claim 13 wherein said charge sensing means includes:
- n electrometers, having respective input ports connected to respective ones of the output ports of said n first through $n^{th}$ CCD shift registers, and having respective output ports; and
- a time-division-multiplexer for selecting output video signal samples from the one of said n electrometers currently receiving charge packets from a charge transfer channel of said line-transfer register.

15. A CCD imager as set forth in claim 13 wherein the number of charge transfer channels in said line-transfer register is l, the number of pixels per line trace interval in m, and n is chosen at least as large the ratio of l times duration of line trace interval to m times p times duration of line retrace interval—and wherein said charge sensing means includes:
- an electrometer with an input port and an output port, and
- CCD shift register connections of the output ports of said first through $n^{th}$ CCD shift registers to the input port of said electrometer for providing a overall delay from the output ports of the charge transfer channels of said image register to the input port of said electrometer falling between a first length of time $D_1$ and a second length of time $D_2$, where $D_2$ is a positive integer times 1H and where $D_1$ is shorter than $D_2$ by a line retrace interval, 1H being the combined duration of a line trace interval and a line retrace interval.

16. A CCD imager as set forth in claim 13 wherein said charge sensing means includes an electrometer with an input port and an output port, and wherein said n CCD shift registers include a first and a second CCD shift register being arranged for charge transfer in opposite directions and having their output ports connected to the input port of said electrometer.

17. A CCD imager as set forth in claim 14 wherein n is at least as large as 5 l/mp.

18. A CCD imager comprising:
- a line-transfer register having therein a parallel array of charge transfer channels, l in number with respective ports in parallel alignment, the output ports being grouped into a plurality p in number of groups, each group containing at least two contiguous output ports, p being chosen larger than the ratio of l times the duration of the line trace interval to the number of pixels per line trace interval times the duration of the line retrace interval;
- line selection means for selectively forward clocking the charge transfer channels in said line-transfer register;
- a plurality p in number of charge packets multiplexers, each having a respective plurality of input ports connected to the output ports of line-transfer register charge transfer channels in a different one of said groups of image register charge transfer channels and having a respective output port;
- a CCD shift register side loaded in successive charge transfer stages thereof from respective ones of the output ports of said charge packet multiplexers; and
- charge sensing means having an input port for receiving charge packets and having an output port for delivering samples of video output signals dependent on the amplitudes of the charge packets received at its input port.

* * * * *